Feb. 25, 1958     B. WIER     2,824,448
MILK VOLUME METERING APPARATUS
Filed Jan. 2, 1952
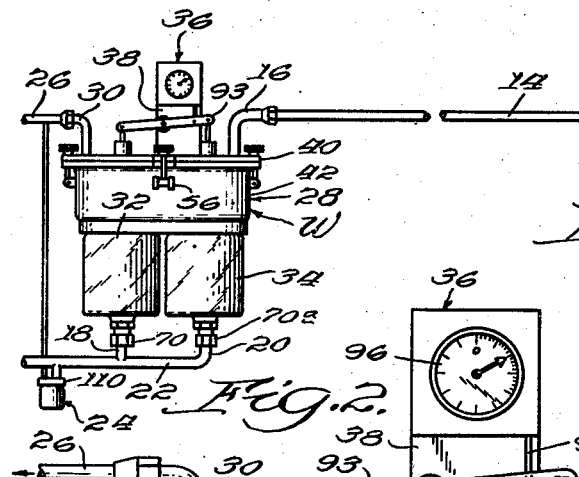
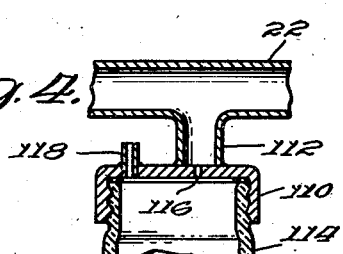
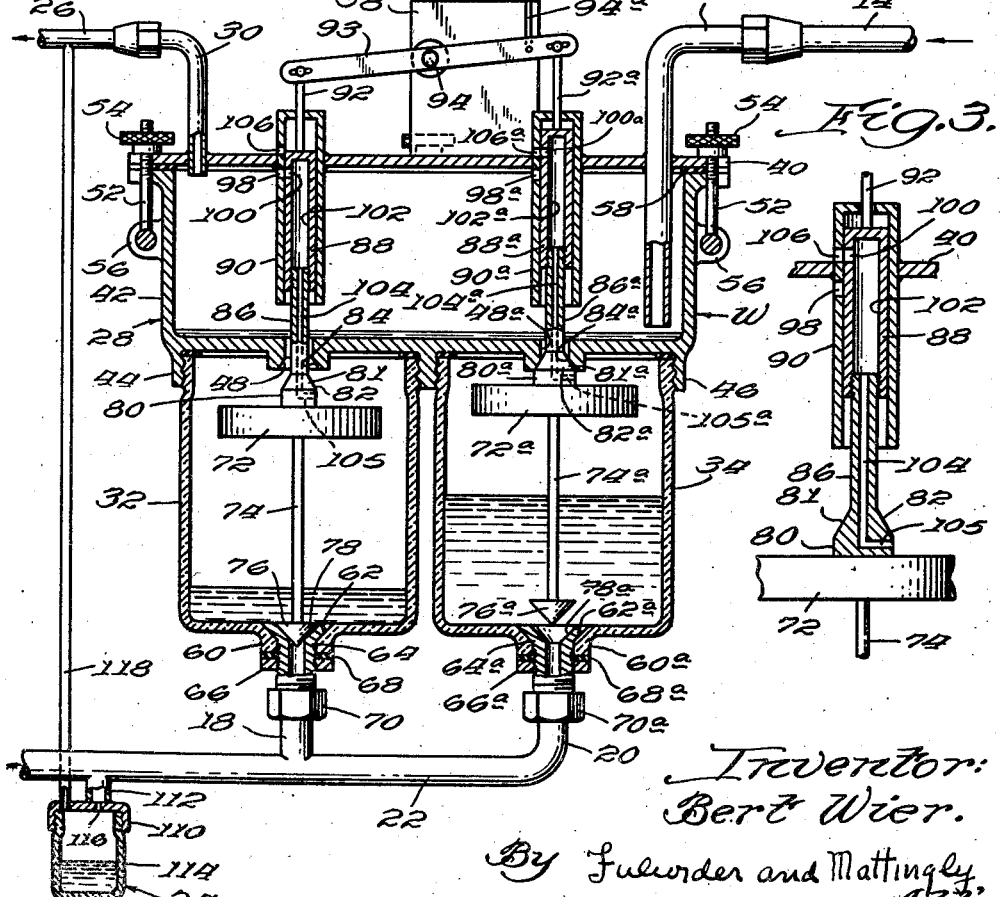
Inventor:
Bert Wier.
By Fulwider and Mattingly
Attys.

United States Patent Office 2,824,448
Patented Feb. 25, 1958

2,824,448

MILK VOLUME METERING APPARATUS

Bert Wier, Artesia, Calif.

Application January 2, 1952, Serial No. 264,442

8 Claims. (Cl. 73—221)

The present invention relates generally to the dairying art, and more particularly to novel apparatus for indicating the milk output of a cow.

In order to maintain the efficiency of a dairying operation it is essential to retain as milkers, only those cows which can produce an adequate amount of butter fat to justify their continued maintenance. If a cow cannot produce a minimum amount of butter fat, it will be disposed of, usually by butchering. Unless this procedure is followed, the cost of maintaining the cow can easily exceed the value of the butter fat produced by the cow. Clearly such a situation cannot long be tolerated.

The amount of butter fat produced by a cow is determined not only by the quantity or weight of milk she gives, but also by the butter fat content of such milk. Thus, while some cows give a large quantity of milk, the butter fat content thereof is very low. On the other hand, certain cows may give a comparatively small amount of milk, but such milk may be so high in butter fat content as to result in a high total of butter fat. Accordingly, it is essential in properly evaluating the total butter fat-producing ability of a cow to be able to closely determine both the volume and the butter fat content of the milk she gives.

Formerly, little difficulty was experienced in the determination of these two factors, since all milking was performed by hand into buckets. Hence, the number of buckets given by each cow and the butter fat content of its milk could be easily determined at any time. Modernly, however, the vast majority of milking is performed by machine, the production of several cows flowing into a common pipeline. Hence, the only manner whereby the milk production of an individual cow may be tested is by causing the milking machine to empty into a bucket positioned adjacent the cow to be tested; the milk thus received being weighed and tested for butter fat content. A serious disadvantage of such test milking into buckets exists. It has been observed that a cow becomes accustomed to being milked in a definite manner, and once a cow grows accustomed to having its milk flow into a pipeline, the presence of a bucket during the milking operation may easily upset the cow. When upset, the cow is very likely to give less milk than is her normal habit. For this reason, it may be impossible to determine by occasional test milking into a bucket, the actual amount of milk the cow gives when milked in its daily fashion.

The apparatus of my present invention was developed in order to overcome these disadvantages, and its major object is to provide a means whereby the volume of milk produced by one or more cows by means of a milking machine may be determined, as well as to permit the sampling of the milk so produced.

Since it is essential that any equipment which may come into direct contact with milk must be completely sanitary, another object of my invention is to provide a device of this type which is entirely enclosed, but yet may be easily disassembled for periodic cleaning.

Another object of the present invention is to provide a device of this type which is entirely automatic in operation.

It is a further object of my invention to provide a device of this type which is simple of construction whereby it will be inexpensive of manufacture and will not require extensive maintenance.

An additional object of the invention is to provide a device of this type which may be utilized with existing milking machines without requiring other than minor modifications.

Other objects and advantages of my invention will become apparent from the following detailed description of a preferred embodiment thereof, taken in conjunction with the following drawing, wherein:

Figure 1 is a view in side elevation showing the general arrangement of the apparatus of the present invention when arranged for operation;

Figure 2 is an enlarged sectional view showing said apparatus in side elevation;

Figure 3 is a further enlarged fragmentary view of a detail shown in Figure 2;

Figure 4 is another further enlarged fragmentary view of an additional detail shown in Figure 2.

Referring to the drawings, and particularly to Figure 1 thereof, the novel milk volume determining device W of the present invention is adapted to receive milk directly from the bag 10 of a cow through a conventional pulsator and teat cup assembly 12 and a milk line 14, the latter being connected to an inlet pipe 16. The device W includes two outlets 18 and 20 which intersect a flow pipe 22, which pipe may communicate with a main pipeline (not shown) into which milk from several cows may enter. A sampling jar 24 depends from the flow pipe 22 whereby may be collected a portion of the milk passing through the device W. This portion may be tested for butter fat content. A vacuum line 26 is in communication with device W and the sampling jar 24 for reasons to be set forth hereinafter.

The device W generally comprises a distribution chamber 28 rigidly mounting at its right side the inlet pipe 16 and at its left side a vacuum connection 30. Depending from the lower portion of the distribution chamber 28 are a pair of substantially identical jars 32 and 34, the bottom portions of these jars mounting the outlets 18 and 20, respectively. A counting mechanism 36 is secured to the upper portion of the device W, as by an upstanding support 38 rigidly affixed at its lower end to the cover 40 of the device.

More particularly, the distribution chamber 28 is defined by a main body 42 to which is removably affixed the cover 40. The base of this body 42 is formed with a pair of depending threaded sleeve portions 44 and 46 which respectively receive the upper threaded ends of the jars 32 and 34. This base is also formed with inlet ports 48 and 48a connecting the interior of the distribution chamber 28 with these jars. The cover 40 will preferably be removably secured upon the distribution chamber by means of tie rods 52 mounting knurled nuts 54. These tie rods are each shown pivotally attached at their lower end to bifurcated lugs 56, which lugs are integral with the sides of the main body 42. A sealing gasket 58 is shown disposed between the main body and its cover 40.

Each of the jars 32 and 34 is indicated as being of glass construction. While the use of glass for this purpose is not essential, it does facilitate the cleaning and inspection of these jars. The remaining elements of the device W will preferably be formed of an easily cleaned, non-corrosive metal, such as stainless steel.

The base of each jar is centrally formed with a depending sleeve portion, these portions being designated 60 and 60a. The upper end of the bore of each sleeve portion is of enlarged diameter defining a conical seat 62 and 62a adapted to mount the cone-shaped upper end of threaded fittings 64 and 64a. These fittings are secured in place by means of nuts 66 and 66a, which nuts may be tightened against the bottom of the sleeve portions 60 and 60a. Preferably a sealing ring 68 and 68a will be disposed between these nuts and the sleeve bottoms. The lower ends of the fittings 64 and 64a are shown connected to the flow pipe 22 by means of nuts 70 and 70a.

In the operation of my device W, it is contemplated that milk entering the distribution chamber 28 through the inlet pipe 16 first be directed into one of the jars so as to fill it with a predetermined quantity of milk. After such predetermined amount has entered this first weighing jar, the flow thereto is cut off and directed instead into the second weighing jar. During the period the second jar is being filled, the milk in the first jar will be draining into the flow pipe 22. After the second jar has been filled to the predetermined amount, milk will again be directed to the first jar; the second jar draining into the flow pipe 22. It is further contemplated that each such cycle be indicated by the recording mechanism 36. Hence, if the predetermined amount of milk alternately directed to the jars is selected so as to equal one pound, for example, the total amount of milk produced by the cow during its milking period may be accurately determined either as to volume or by weight.

In order to carry out this operation each jar houses a float 72 and 72a free to rise and fall under the influence of milk directed into the jars. Depending from each float are rods 74 and 74a terminating at their lower ends in conical valve plugs 76 and 76a. These valve plugs are adapted to seat within the inner periphery 78 and 78a of the cone-shaped upper ends of the fittings 64 and 64a so as to restrain flow therethrough. The floats 72 and 72a are each formed with upstanding bosses 80 and 80a having a truncated conical upper portion 82 and 82a. The upper portion of these bosses constitute valve plugs 81 and 81a adapted to seat within the downwardly-flared conical bottom portion 84 and 84a of the inlet ports 48 and 48a.

Extending upwardly from each of the bosses 80 and 80a are tubes 86 and 86a, which tubes are threadedly connected at their upper ends to the lower ends of hollow plungers 88 and 88a. These plungers are shown slidably disposed within tubular valve bodies 90 and 90a, the latter being rigidly affixed, as by welding, to the cover 40 and closed on their upper ends. A pair of upstanding short arms 92 and 92a are rigidly mounted upon the top of each plunger 88 and 88a, which arms extend through bores formed in the top of the valve bodies 90 and 90a. The upper ends of these arms 92 and 92a are pivotally connected to opposite sides of a lever 93; the lever in turn being pivotally mounted at its center portion from the support 38 by means of a pin 94.

It will be observed that by virtue of the aforedescribed arrangement, the floats 72 and 72a, their attached valve plugs 76 and 76a and 81 and 81a, and plungers 88 and 88a are interconnected for simultaneous movement. Thus, if the length of the rods 74 and 74a and bosses 80 and 80a be properly chosen, at such time as the lower valve plug 76 is so positioned as to seal off the outlet 18, the upper valve plug 81a will be so positioned as to seal off the inlet port 48a, as shown in Figure 2. In this manner, milk will be free to flow into jar 32 but will be cut off from jar 34. At the same time, milk previously contained in jar 34 will be free to flow through outlet 20 into the flow pipe 22; the lower valve plug 76a being raised off its seat 78a. Then, if the floats 72 and 72a have been properly selected, as soon as the amount of milk which weighs, for example, one pound has entered jar 32, the float 72 will rise thereby raising valve plugs 76 and 81. This rising movement will also be transferred through tubes 86 and 86a, plungers 88 and 88a, arms 92 and 92a and lever 93 to the float 72a and its attached valve plugs 76a and 81a. In this manner, milk from the distribution chamber 28 will be cut off from jar 32 in favor of jar 34. Likewise, milk from jar 32 will now be free to enter the flow pipe. Additionally, by virtue of the interconnection of the lever 93 with the counting mechanism 36 through a link 94a, the alternate pivoting of the lever may be indicated thereon by visual means. This mechanism will preferably include a dial 96 whereon the cumulative number of alternate pivoting movements effected by the lever in the jar-filling cycles may be determined. The counting mechanism indicates each alternate pivotal movement of the lever whereby when the cumulative number of alternate lever movements, together with the volume of the receptacles is known, it is a simple matter to compute the milk production of one or more cows.

At this point it should be noted that the operation of the milking assembly 12 requires the existence of a vacuum within the milk line 14. Accordingly, a vacuum must likewise exist within the distribution chamber 28 and the interior of the jar into which milk is flowing from this chamber. At the same time the interior of the jar from which milk is being withdrawn must exist at at least the same pressure as that found in the flow pipe 22 (generally atmospheric). In order that these conditions may exist the distribution chamber 28 is seen to be connected with the vacuum line 26 by means of the vacuum connection 30. Additionally, the valve bodies 90 and 90a are each formed with ports 98 and 98a in their portion disposed within the distribution chamber. Thus, as shown in Figures 2 and 3, at such time as the jar 32 is being filled with milk, the interior thereof is in communication with the distribution chamber by means of port 98, a port 100 formed at one side of the plunger 88, the bore 102 of this plunger, an axial bore 104 formed in tube 86 and a radial bore 105 formed in the boss 80. At the same time, the interior of the jar 34 is seen to be in communication with the atmosphere by means of a port 106a formed in the valve sleeve 90a, port 100a, the bore 102a of the plunger 88a, axial bore 104a and radial bore 105a. It will be apparent that at such time as the positions of the floats 72 and 72a are reversed, the plunger ports 100 and 100a will be aligned respectively with valve sleeve ports 106 and 98a.

Another important aspect of my invention is the utilization of the sampling jar 24 in conjunction with the device W. As mentioned previously hereinbefore, it is necessary in order to properly evaluate a cow's worth as a milker to determine both the volume of milk the cow produces and also the butter fat content of such milk. It is contemplated that this latter factor be found by means of the sampling jar 24. This jar includes a mounting element 110 connected to the flow pipe 22 by a short pipe 112. The lower portion of the mounting element 110 is threaded to removably receive an open-mouthed glass bottle 114. A small port 116 permits milk carried by flow pipe to enter the bottle 114 each time one of the weighing jars 32 and 34 empties into the flow pipe. The diameter of this port 116 should be so chosen that at the completion of the milking operation a small amount of each jar-full of milk will be disposed within the bottle 114. In this manner the bottle 114 may be unscrewed from the mounting element 110 whereby the average butter fat content of all of the milk produced by the cow may be accurately found. This is an important consideration, inasmuch as the butter fat content generally varies during the milking operation. A conduit 118 is seen to connect the sampling jar 24 with the vacuum line 26 whereby the interior of this jar will exist at substantially the same pressure as is found within that jar which is emptying into the flow pipe 22.

It will be apparent that the above-described apparatus is adapted to provide an accurate determination of both the volume of milk being produced by a cow and also the butter fat content thereof. Additionally, the construction set forth lends itself admirably to the frequent and thorough cleaning to which any device coming into direct contact with milk must be subjected. To this end, the jars 32 and 34 may be easily unscrewed from the main body 42, while the cover of this body is likewise readily removed upon unscrewing the nuts 54.

It will be apparent to those skilled in the art that various modifications and changes may be made with respect to the embodiment described hereinabove without departing from the spirit of the invention and the scope of the following claims.

I claim:

1. An apparatus for use with mechanical milking equipment that indicates the milk production of one or more cows, including: two receptacles of known volume, each of which has a fluid outlet formed in the bottom thereof; an open-topped fluid distribution chamber having two spaced first ports formed in the bottom thereof; means for removably securing each of said receptacles to the bottom of said chamber in communication with one of said ports; a cover that is removably mounted on the open top of said chamber and effects an air-tight seal therewith; two vertical tubular valve bodies having second ports formed in the upper portions thereof and sealed upper extremities, which bodies are so affixed to said cover that the upper portions thereof project thereabove with said second ports communicating with the ambient atmosphere and with said bodies being in alignment with said first ports when said cover is mounted on said chamber; a horizontally disposed pin supported above said cover; a lever pivotally supported on said pin; two arms pivotally connected to the end portions of said lever and extending downwardly into said valve bodies through openings formed in the upper ends thereof; two hollow plungers connected to the lower ends of said arms and having open lower ends, which plungers are slidably mounted in said valve bodies and have third ports formed in the upper portions thereof that may be brought into alignment with said second ports; a float disposed within each of said receptacles; a first valve plug positioned above each of said floats in fixed relationship thereto, which plugs may effect fluid-tight seals with said first ports; two rigid tubes extending upwardly from said valve plugs through said first ports to rigidly engage said lower open ends of said plungers, each of which tubes communicate with a fourth port formed in one of said plugs; two rods depending downwardly from said floats, which rods are in alignment with said fluid outlets; two second valve plugs mounted on the lower ends of said rods and adapted to effect fluid-tight seals with said outlets; fluid discharge means connected to said outlets; a fluid-conducting line extending from said equipment to the interior of said chamber; and a conduit extending into the upper portion of said chamber through which air is constantly withdrawn to form a vacuum in said chamber and that receptacle being filled whereby fluid flows from said line into said chamber to be alternately distributed to said receptacles through said first ports, with fluid flow continuing to one of said receptacles until said float contained therein is raised to concurrently displace said second valve plug associated therewith from one of said outlets to permit flow of fluid to said discharge means, dispose said first valve plug associated therewith in sealing engagement with one of said first ports, move said valve plunger associated therewith upwardly to bring one set of said second and third ports into alignment to break the vacuum existing in said receptacle, and pivot said lever to move said first and second valve plugs and plunger into positions permitting fluid flow into the other of said receptacles from said chamber.

2. An apparatus for use with mechanical milking equipment that indicates the milk production of one or more cows, including: two receptacles of known volume, each of which has a fluid outlet formed in the bottom thereof; an open-topped fluid distribution chamber having two spaced first ports formed in the bottom thereof; means for removably securing each of said receptacles to the bottom of said chamber in communication with one of said ports; a cover removably mounted on the top of said chamber in fluid-tight seal therewith; a float disposed within each of said receptacles; a first valve plug connected to each of said floats, each of which plugs is adapted to effect a fluid-tight seal with one of said first ports when that float with which it is associated occupies its maximum upper position in its receptacle; a second valve plug connected to each of said floats, each of which second valve plugs is adapted to effect a fluid-tight seal with one of said fluid outlets when that float with which it is associated occupies its maximum downward position in its receptacle; a horizontally disposed pin supported above said cover; a lever pivotally supported on said pin; means pivotally connecting said floats to the end portions of said lever, which lever regulates relative movement of said floats whereby when one of said floats is at its maximum upper position the other of said floats is at its maximum lower position; fluid-conducting means communicating with the interior of said chamber through when fluid may flow from said equipment; fluid discharge means connected to said outlets; a line extending into the upper portion of said chamber through which air is constantly withdrawn to form a vacuum in said chamber and that receptacle being filled to cause fluid flow into said chamber through said conducting means; and valve means that are actuated as said floats move between said maximum upper and lower positions, which valve means establishes communication between the atmosphere and one of said receptacles when that float in said receptacle occupies said maximum upper position permitting fluid therein to drain into said discharge means, with said valve means obstructing communication between the atmosphere and one of said receptacles when that float therein occupies said maximum lower position, and the quantity of fluid passing through said apparatus being determined by the number of times said receptacles are filled as fluid flows therefrom to said fluid discharge means.

3. An apparatus for use with mechanical milking equipment that indicates the milk production of one or more cows, including: two receptacles of known volume, each of which has a fluid outlet formed in the bottom thereof; an open-topped fluid distribution chamber having two spaced first ports formed in the bottom thereof; means for removably securing each of said receptacles to the bottom of said chamber in communication with one of said ports; a cover removably mounted on the top of said chamber in fluid-tight seal therewith; a float disposed within each of said receptacles; a horizontally disposed pin supported above said cover; a lever pivotally supported on said pin; means pivotally connecting said floats to the end portions of said lever, which lever regulates relative movement of said floats whereby when one of said floats is at its maximum upper position the other of said floats is at its maximum lower position; first valve means connected to each of said floats, which means closes that one of said first ports through which fluid flows into that receptacle in which said float is disposed when it is in its maximum upper position and concurrently opens said fluid outlet in said receptacle; fluid-conducting means communicating with the interior of said chamber through which fluid may flow from said equipment; fluid discharge means connected to said outlets; a line extending into the upper portion of said chamber through which air is constantly withdrawn to form a vacuum in said chamber and that receptacle being filled to cause fluid flow into said chamber through said conducting means; and a second valve means that are actuated as said floats move between said maximum upper and lower positions, which second valve means establishes communication between the atmosphere and one of said receptacles when that float in said receptacle occupies said maximum upper position permitting fluid therein to drain into said discharge means, with said second valve means obstructing communication between the atmosphere and one of said receptacles when that float therein occupies said maximum lower position, and the quantity of fluid passing through said apparatus being determined by the number of times said receptacles are filled as fluid flows therefrom to said fluid discharge means.

4. An apparatus for use with mechanical milking equipment that indicates the milk production of one or more cows, including: two receptacles of known volume, each of which has a fluid outlet formed in the bottom thereof; an open-topped fluid distribution chamber having two spaced first ports formed in the bottom thereof; means for removably securing each of said receptacles to the bottom of said chamber in communication with one of said ports; a cover removably mounted on the top of said chamber in fluid-tight seal therewith; fluid-conducting means communicating with the interior of said chamber through which fluid may flow from said equipment; fluid discharge means connected to said outlets; a line extending into the upper portion of said chamber through which air is constantly withdrawn to form a vacuum in said chamber and that receptacle being filled to cause fluid flow into said chamber through said conducting means; a float situated in each of said receptacles; pivotally movable means which so control relative movement of said floats that when one of said floats occupies its maximum upper position the other of said floats occupies its maximum lower position; first valve means connected to each of said floats that permit fluid to flow through one of said first ports into one of said receptacles when the float therein occupies its maximum lower position and permits fluid flow into said discharge means when said float is in its maximum upper position; and second valve means that are actuated as said floats move between said maximum upper and lower positions, which second valve means establishes communication between the atmosphere and one of said receptacles when that float in said receptacle occupies said maximum upper position permitting fluid therein to drain into said discharge means, with said second valve means obstructing communication between the atmosphere and one of said receptacles when that float therein occupies said maximum lower position, and the quantity of fluid passing through said apparatus being determined by the number of times said receptacles are filled as fluid flows therefrom to said fluid discharge means.

5. An apparatus for use with mechanical milking equipment that indicates the milk production of one or more cows, including: two receptacles of known volume, each of which has a fluid outlet formed in the bottom thereof; an open-topped fluid distribution chamber having two spaced first ports formed in the bottom thereof; means for removably securing each of said receptacles to the bottom of said chamber in communication with one of said ports; a cover removably mounted on the top of said chamber in fluid-tight seal therewith; a float disposed within each of said receptacles; means that so control relative movement of said floats that when one of said floats occupies its maximum upper position the other of said floats occupies its maximum lower position; a passageway extending between the ambient atmosphere and each of said receptacle outlets when said float therein is in its maximum upper position and concurrently obstructs said port and opens said passageway leading into said receptacle and permitting fluid contained therein to drain into said discharge means.

6. A dairy milk volume metering apparatus for use with mechanical milking equipment to indicate the milk production of one or more cows, including: a fluid distribution chamber having two spaced first ports formed in the bottom thereof, which chamber communicates with the vacuum line leading from said milking machine to receive milk therefrom; two receptacles of known volume each having a fluid outlet formed in the bottom thereof and each being removably attached to the bottom of said chamber in communication with one of said ports; float- able valve means disposed within each of said receptacles that close said first port when fluid in said receptacle rises to a predetermined level and that can be moved to close said fluid outlet in the bottom of said receptacle when said fluid is lower than said predetermined level; pivotally movable link means connected to both of said floatable valve means to control relative movement thereof so that when one of said valve means closes said port associated therewith, the other of said valve means closes said fluid outlet of the receptacle associated therewith; and a closable passageway forming a part of said link means and extending between the ambient atmosphere and each of said receptacles through each of said ports, with one of said passageways being open to the atmosphere when said valve means associated therewith is in port closing position and fluid outlet opening position to permit said fluid to be drawn through said outlet and the other of said passageways being closed to the atmosphere when the other of said valve means associated therewith is in port opening position and fluid outlet closing position so that milk flows from said vacuum line into said chamber through such open port until reaching said predetermined level to cause said other floatable valve means to rise to close said port associated therewith and simultaneously open the other of said ports.

7. A milk volume metering apparatus for use with mechanical milking equipment to indicate the milk production of one or more cows, including: a fluid distribution chamber having two spaced ports in the bottom thereof, said chamber communicating with the vacuum line leading from said milking machine to receive milk therefrom; two receptacles of known volume, each having a fluid outlet formed in the bottom thereof and each being removably attached to the bottom of said chamber in communication with one of said ports; a float in each of said receptacles; first valve means connected to each of said floats, said valve means closing said outlet and opening said port when said float is in maximum lower position to permit fluid flow into said receptacle from said chamber until said fluid raises to a predetermined level in said receptacle to cause said float to occupy its maximum upper position wherein said first valve means close said port and open said outlet to permit fluid to be discharged from said receptacle; pivotally movable means which so control relative movement of said floats that when one of said floats occupies its maximum upper position the other of said floats occupies its maximum lower position; and second valve means that are actuated as said floats move between said upper and lower positions, which second valve means establishes communication between the atmosphere and one of said receptacles when said float in said receptacle occupies said upper position permitting fluid therein to drain through said outlet, with said second valve means obstructing communication between the atmosphere and one of said receptacles when that float therein occupies said lower position, and the quantity of fluid passing through said apparatus being determined by the number of times said receptacles are filled.

8. A milk volume metering apparatus for use with mechanical milking equipment to indicate the milk production of one or more cows, including: a fluid distribution chamber having two spaced ports in the bottom thereof, said chamber communicating with the vacuum line leading from said milking machine to receive milk therefrom; two receptacles of known volume, each having a fluid outlet formed in the bottom thereof and each being removably attached to the bottom of said chamber in communication with one of said ports; a float in each of said receptacles; a horizontally disposed pin supported above said chamber; a lever pivotally supported on said pin; means pivotally connecting said floats to the opposite end portions of said lever, which lever so regulates relative movement of said floats that when one of said floats is at its maximum upper position the other of said floats is at its maximum lower position; first valve means connected to each of said floats, said valve means closing said outlet and opening said port when said float is in maximum lower position to permit fluid flow into said receptacle from said chamber until said fluid raises to a predetermined level in said receptacle to cause said float to occupy its maximum upper position wherein said first valve means close said port and open said outlet to permit fluid to be discharged from said receptacle; and second valve means that are actuated as said floats move between said upper and lower positions, which second valve means establishes communication between the atmosphere and one of said receptacles when said float in said receptacle occupies said upper position permitting fluid therein to drain through said outlet, with said second valve means obstructing communication between the atmosphere and one of said receptacles when that float therein occupies said lower position, and the quantity of fluid passing through said apparatus being determined by the number of times said receptacles are filled.

References Cited in the file of this patent
UNITED STATES PATENTS

| | | |
|---|---|---|
| 1,519,827 | Fuge | Dec. 16, 1924 |
| 1,534,939 | Fuge | Apr. 21, 1925 |
| 1,546,437 | Daysh | July 21, 1925 |
| 1,573,176 | Liebing et al. | Feb. 16, 1926 |
| 1,589,068 | Givens | June 15, 1926 |
| 1,844,956 | Hapgood | Feb. 16, 1932 |
| 2,009,400 | Hapgood | July 30, 1935 |
| 2,564,620 | Berry | Aug. 14, 1951 |
| 2,630,712 | Harstick et al. | Mar. 10, 1953 |
| 2,648,225 | Hemmens | Aug. 11, 1953 |